Jan. 18, 1944.   LE ROY M. KUBAUGH   2,339,549
RESILIENT WASHER
Filed March 6, 1941
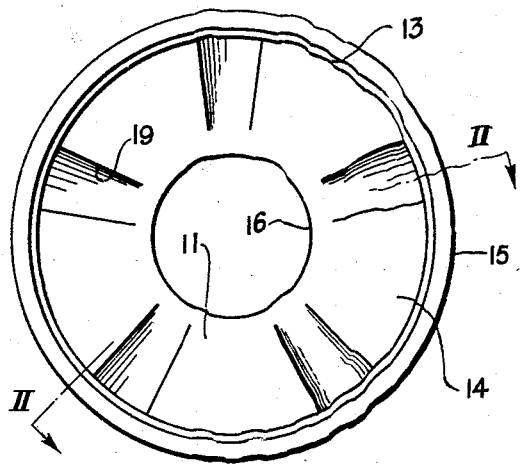
FIG. I
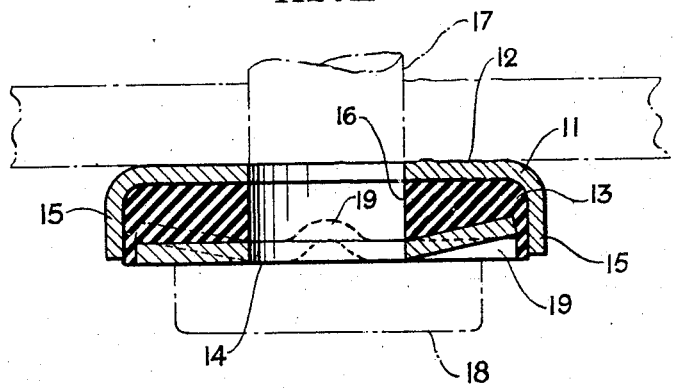
FIG. II
INVENTOR
LEROY M. KUBAUGH
ATTORNEYS Patented Jan. 18, 1944

2,339,549

UNITED STATES PATENT OFFICE 2,339,549

RESILIENT WASHER

Le Roy M. Kubaugh, Akron, Ohio, assignor to The Firestone Tire & Rubber Company, Akron, Ohio, a corporation of Ohio Application March 6, 1941, Serial No. 381,957

5 Claims. (Cl. 85—50)

This invention relates to a vibration dampening device and more especially it relates to such said devices which advantageously may be used to cushion bolts, such as are used to secure together vibrating parts of a structure.

Bolts used to secure sections of trackway rails together are good examples of bolts of the aforementioned class. Such bolts are subject to severe and varied stresses and repeated vibration, with the result that they frequently crystallize and eventually are sheared off.

The general object of the invention is to provide a vibration dampening device adapted to carry high compressive loads, and at the same time to provide cushioning for vibrating elements.

Another object of the invention is to provide a substantially totally enclosed rubber body for cushioning bolts from elements secured together thereby.

The foregoing and other objects will be manifest as the specification proceeds, which specification has particular reference to the accompanying drawing, of which:

Fig. I is a bottom plan of a vibration dampening device embodying the invention; and Fig. II is a diametric section taken on the line II—II of Fig. I, and a bolt, shown in broken lines, in operative association with the device.

Referring in detail to the drawing, a vibration dampening device 11, including a circular metal plate, or cup-shaped housing 12, a rubber body 13, and a metal disc 14, is shown. The housing 12 has a continuous flange 15 extending therefrom in one direction at its periphery and the disc 14 is snugly received in the end thereof to form a substantially totally enclosed chamber. The rubber body, usually vulcanized, may be made from natural rubber, or from an oil and grease-resistant, rubber-like material, such as neoprene (which is polymerized 2 chloro-1,3 butadiene). The rubber body or washer is initially formed to fit in the chamber formed by the housing 12 and disc 14, being shown in its normal form in Fig. II. An aperture 16 is formed through the device 11 and a bolt 17 having a head 18 is received therein with the head bearing on the disc 14. In other instances, the nut on the bolt 17 may bear on the disc but in all events, the bolt extends through the members to be secured together thereby, and draws the members and device 11 together to form a unit.

It will be seen that the rubber body 13, as shown in its assembled, uncompressed position, has a restricted escapement space, or is almost 100% confined so that the rubber resists relative movement of the disc 14 towards the housing 12, and only a small volume thereof flows from between the disc and housing, as the rubber body is compressed by tightening the bolt 17. In all events, the rubber body 13 resiliently resists movement of the disc towards the housing 12, which resiliency absorbs at least a portion of the vibration and/or shock attendant sudden change of the load applied to the bolt 17. Note that radially extending corrugations 19 are formed in the surface of the disc 14 adjacent housing 12, thereby providing an increased area to the surface of the disc to which the rubber is vulcanized, thus increasing the total adhesion of the rubber to said disc, while at the same time the corrugations provide grooves into which the rubber is molded and thereby locks itself against turning on the surface of the disc thus preventing relative movement therebetween. Said corrugations also strengthen the disc against the axial pull of the bolt 17. The corrugations increase in depth the farther they extend from the center of the disc in order to strengthen same in proportion to the loads applied thereto. The corrugations should not be diametrically opposed as that decreases the disc's resistance to folding on such diameter.

When the device is assembled, as indicated in Fig. II, it absorbs or smooths out the shock and jar of vibrations to which the bolt 17 is subjected by allowing movement of the disc with relation to the housing 12 due to flow of the rubber of the body 13, said rubber flowing between the edges of the disc 14 and the flange 15. Bolts securing rail sections together have been provided with the device of the invention, and have proved very successful in preventing bolt failures. By confining the rubber it can stand the high stresses to which the bolts are subjected. Ovbiously, the device can be other than circular, as shown herein. Ordinarily the rubber is vulcanized to the metallic means confining same.

The detailed description of the particular embodiment of the invention illustrated and described herein is not to be construed as limiting the invention thereto. The invention includes all features of patentable novelty residing in the foregoing description and the accompanying drawing, as determined by the following claims.

What is claimed is:

1. A shock absorbing washer adapted to engage with and be compressed by a bolt, said washer comprising an apertured metal plate having an endless integral circular flange extending from one surface thereof, an apertured metal disc adapted to fit within said flange, said disc having a plurality of substantially radially directed corrugations extending from one surface thereof in a direction towards said plate when said disc is associated therewith, and an apertured rubber body received between said plate and said disc when said disc is associated with said plate in order to absorb vibrations therebetween.

2. A vibration dampening device adapted to engage with and be compressed by a bolt, said device comprising an apertured metal plate having an endless marginal flange extending integrally from one surface thereof, an apertured metal disc disposed within the confines of said flange, said disc being of lesser diameter than the marginal flange to allow an annular channel therebetween, said disk being provided with a plurality of corrugations formed therein which increase in depth with increased radial length thereof, and an apertured oil-resistant rubber-like body received between said plate and said disc and adapted to absorb vibrations therebetween.

3. In a device of the character described, a metal plate having an endless flange extending laterally from one side thereof, a second metal plate, having corrugations formed therein, disposed within the confines of and substantially filling the area enclosed by said flange, and a rubber body positioned between said plates and said flange and having only a restricted escapement space therebetween, the device having an aperture extending therethrough for the reception of a compressing member that draws said metal plates together and causes slight flow of said rubber body which is adapted to absorb vibrations between said plates.

4. In a device of the character described, the combination with a pair of rigid members, at least one of said members being subjected to vibration inducing stresses, of a vibration dampening device adapted for disposition intermediate the members for the minimization of the vibration transmission therebetween, said device comprising a cup-shaped housing having a central aperture through which one of said members projects in snug fit relation, a resilient body disposed within the housing and adapted to fill the space intermediate the central aperture and the outer walls thereof, and a centrally apertured disk carried by said centrally positioned member and having ribbed portions engaging the outer wall of the resilient body, said disk being of lesser diameter than the inside diameter of the housing whereby to provide a channel for the flow of the resilient body during compression thereof by relative movement between the rigid members.

5. A vibration dampening resilient washer adapted to be compressed during use, said resilient washer comprising a cup-shaped housing and a circular plate of lesser diameter than the housing and centrally disposed therein, said plate provided with radially disposed portions depressed inwardly of the housing, a rubber body confined between the inner walls of the housing and the plate, said housing, body and plate being centrally apertured for reception of a compression member having a portion abutting said plate for clampingly maintaining the device compressed between the members.

LE ROY M. KUBAUGH.